United States Patent [19]

Rolfo et al.

[11] Patent Number: 4,580,916

[45] Date of Patent: Apr. 8, 1986

[54] TYPING DEVICE FOR TYPING IN SEVERAL LANGUAGES BY COMBINING SUB-COMPONENTS OF THE CHARACTERS

[75] Inventors: Arturo Rolfo, Murisengo; Mario Figini, Bosco Marengo; Michele Monasterolo, Strambino; Francesco Mascaro, Chiaverano, all of Italy

[73] Assignee: Ing. C. Olivetti & C., S.p.A., Turin, Italy

[21] Appl. No.: 735,712

[22] Filed: May 20, 1985

Related U.S. Application Data

[63] Continuation of Ser. No. 659,019, Oct. 9, 1984, abandoned, which is a continuation of Ser. No. 372,679, Apr. 28, 1982, abandoned.

[30] Foreign Application Priority Data

Apr. 29, 1981 [IT] Italy ............................... 67574 A/81

[51] Int. Cl.⁴ .............................................. B41J 3/02
[52] U.S. Cl. ................................. 400/109; 400/144.2; 400/83
[58] Field of Search .................. 400/65, 98, 109, 110, 400/111, 121, 125, 125.1, 144, 144.1, 144.2, 144.3, 144.4, 114, 115, 697.1, 900, 83

[56] References Cited

U.S. PATENT DOCUMENTS

| | | | |
|---|---|---|---|
| 1,169,739 | 1/1916 | Allard | 400/110 |
| 2,526,633 | 10/1950 | Brumbaugh | 400/110 |
| 2,717,686 | 9/1955 | Seeber, Jr. | 400/98 |
| 3,247,941 | 4/1966 | Beattie et al. | 400/174 X |
| 3,267,852 | 8/1966 | Gordon | 400/900 X |
| 3,388,781 | 6/1968 | Effinger | 400/121 |
| 3,973,488 | 8/1976 | Mielke | 400/174 X |
| 4,026,403 | 5/1977 | Inose et al. | 400/144.2 X |
| 4,124,843 | 11/1978 | Bramson et al. | 400/109 X |
| 4,236,838 | 12/1980 | Guerrini | 400/144.3 |
| 4,307,968 | 12/1981 | Habich et al. | 400/144.2 X |
| 4,343,555 | 8/1982 | Abbott | 400/900 X |

FOREIGN PATENT DOCUMENTS

| | | | |
|---|---|---|---|
| 0150555 | 11/1981 | Japan | 400/110 |
| 754344 | 8/1956 | United Kingdom | 400/110 |
| 1016278 | 1/1966 | United Kingdom | 400/98 |
| 2031626 | 4/1980 | United Kingdom | |
| 2046966 | 11/1980 | United Kingdom | |

OTHER PUBLICATIONS

IBM Technical Disclosure Bulletin, "Extended Character Set for Generating Circuit Graphics", Lochner, vol. 25, No. 2, Jul. 1982, pp. 755-756.
IBM Technical Disclosure Bulletin, "Daisy Wheel Printer Expansion of Printwheel Character Set", Czyszczewski et al., vol. 25, No. 4, Sep. 1982, p. 2165.
"Draft Recommendation", ISO/TC97/SC2/WG4 No. 198 for the Teletex System, Feb. 28, 1980, pp. 1 and 12-24.

Primary Examiner—Ernest T. Wright, Jr.
Attorney, Agent, or Firm—Banner, Birch, McKie & Beckett

[57] ABSTRACT

The typing arrangement includes a character-bearing member of the "daisy wheel" type, the symbols of which can be printed at the point of printing either alone or in the form of combinations of successive strikes of certain symbols for constituting a font of printable characters and other symbols which is appreciably greater than the number of symbols on the daisy wheel, and adapted to meet the printing requirements of all the graphical symbols derived from one common alphabetical stem. Each printable character has an individual code which is recognizable by the control circuits of the arrangement which put into operation one or several printing cycles using selection of the symbol or of the symbols on the daisy wheel which make up the character and the displacements of the daisy wheel associated with the printing of the various component symbols. Machines which employ this arrangement may alternatively make use of specific national daisy wheel which is associated in an unequivocal manner with the keyboard of the machine.

13 Claims, 13 Drawing Figures

TYPING DEVICE FOR TYPING IN SEVERAL LANGUAGES BY COMBINING SUB-COMPONENTS OF THE CHARACTERS

This application is a continuation of application Ser. No. 659,019 filed Oct. 9, 1984, now abandoned, which is a continuation of application Ser. No. 372,679 filed on Apr. 28, 1982, now abandoned.

BACKGROUND OF THE DISCLOSURE

The present invention relates to a typing arrangement usable in typewriters, teleprinters and other such machines for performing printing of the characters and symbols of several national alphabet systems.

Typewriters, teleprinters and similar printing machines are normally produced having specialised alphanumeric keyboards designed in accordance with specific national standards and these work in association, in an unequivocal manner, with specialized character-bearing members provided with the same characters and symbols which are indicated on the keyboard. A text which has been typed on one machine and recorded or transmitted on-line will only be able to be correctly printed out by a receiving machine when the two machines belong to the same national standard.

An electronic typewriter of the type referred to above is known, which uses a character-bearing disc or "daisy wheel" provided with a number of characters which is slightly greater than the font of characters constituting the national standard for the country for which the typewriter is designed. The free positions are occupied by characters of other systems which can be selected by carrying out suitable coding of the keyboard. This solution is advantageous since it makes it possible to type several types of script using one single machine, but this advantage is strictly limited to the case of two national alphabet systems where there is a relatively small difference in the characters.

SUMMARY OF THE DISCLOSURE

The object of the present invention is to provide a typing arrangement capable of printing several scripts which occur in coordinated alphabetical systems.

The typing arrangement according to the invention comprises a selector body carrying an international symbol-bearing element, which carries a number of symbols less than the number of symbols present in the written language systems, and means which respond to codes received in order to select and print directly selected symbols on the said element, or, alternatively, to select and print in succession, one or several symbols on the said element in order to reproduce, by making use of combinations of component parts, the symbols of the systems of writing which are not present on the character-bearing element.

Although this specification makes various use of the expressions character, symbol, sign, for simplicity in defining the invention in the claims, the term "symbol" is used generically to encompass all alphanumeric characters, punctuations and diacritical marks, graphical signs and other signs or symbols.

BRIEF DESCRIPTION OF THE DRAWING

The invention will be described in more detail, by way of example, with reference to the accompanying drawing, in which:

FIG. 4 is a table of characters and symbols which are printable using the arrangement in accordance with the invention;

FIG. 5 is a table of characters and symbols which are to be printed;

DESCRIPTION OF THE PREFERRED EMBODIMENT

Typing intervals are given herein in fractions of an inch since standard letter spacings are 1/10", and 1/12" and 1/15" and modern typewriters base carriage movements on multiples of 1/60". These dimensions correspond to 2.54 mm, 2.12 mm, 1.69 mm and 0.423 mm respectively.

Figure 1:
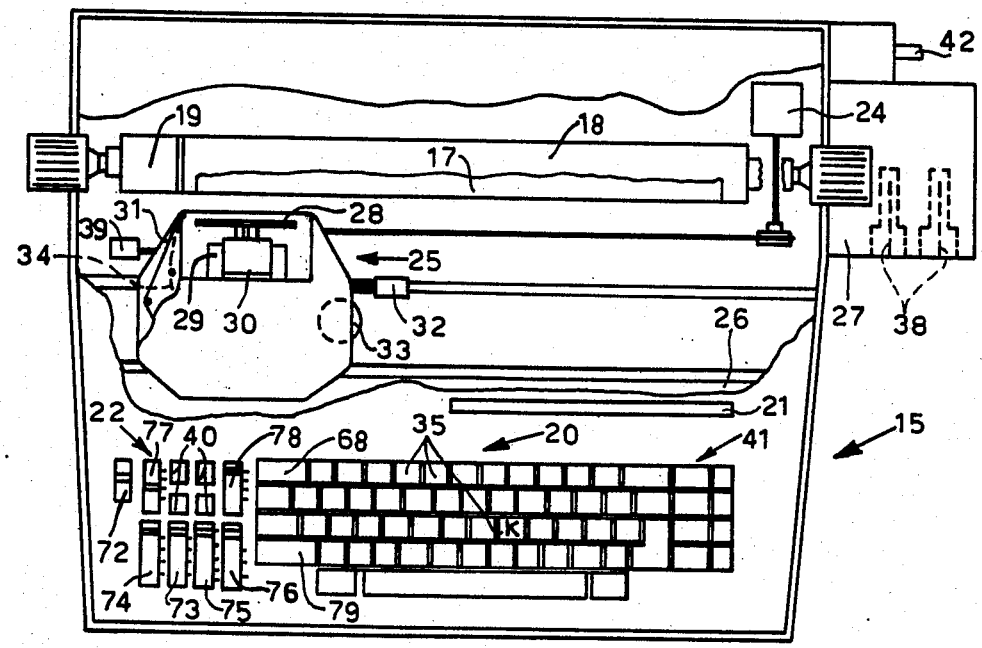
FIG. 1 is a plan view of an electronic typewriter employing an arrangement according to the invention.

The typing arrangement can be applied, by way of example, to an electronic typewriter 15 (FIG. 1) of the type described in the published British Patent Application Pat. No. GB 2,031,626 but can be applied with the same advantages to terminals, teleprinters and similar printing machines.

The typewriter 15 includes a keyboard 20, a visual display device 21, a command console 22, a platen 18, a serial print unit 25 and an electronic unit 26. Additionally, the typewriter 15 includes a unit 27 for reading and/or recording of one or two magnetic discs 38 of the floppy disc type, and for communication on a line 42 with machines of a similar type.

The platen 18 is rotated in increments by a motor 19 in order to provide its line spacing movements. The print unit 25 is displaceable in front of the platen 18 using a transport motor 24, and includes a character-bearing member 28 of the "daisy wheel" type which is rotated in increments by a selector motor 29. The character which has been selected is printed on the sheet of paper 17 by making use of a hammer 30, by means of a typing ribbon 31, which in its turn is raised by an electromagnet 32 and moved along by means of a small motor 33. The characters which have been typed can be erased from the sheet 17 by means of a corrector ribbon 34 which is selected by an electromagnet 39.

The keyboard 20 consists of forty-six alphanumeric keys 35 and service keys 40 and 41 for setting margins, tabulation, editing functions on the text to be typed, movements of the print unit 25 or of the platen 18, for shifting the text on the visual display device 21, carrying out cancellation; selection of pre-recorded phrases stored in the machine and for searching for texts held in the memory, in accordance with the abovementioned Patent Application GB 2,031,626 and the published British Patent Application GB 2,046,966.

The console 22 comprises selectors 73, 74, 75, 76, 77 and 78 whose function will be described later. The electronic unit 26 (FIG. 2) consists of a main board 45 comprising a central processing unit (CPU) 46, memory (ROM) 47 for the basic machine micro-instructions, a working memory (RAM) 48 for temporary storage of data, and a series of microprocessors 49, 50, 51, 52 and 53 for commanding the various mechanisms of the machine and an interface and command circuit 64 for the unit 27.

The microprocessors 49 and 50, via servomotors 54 and 55, respectively control the transport motor 24 for displacing the print unit 25 and the selector motor 29 for carrying out selection, ready for print, of one of the petals of the daisy wheel 28; the microprocessor 51 controls the visual display device 21 via an interface circuit 56; the microprocessor 52, via a suitable coding device 57, provides for the introduction of data originating from the keyboard 20. Finally, the microprocessor 53 transmits the state of the selectors 73, 78 on console 22 to the CPU 46 and, via drive circuits 58, 59, 60, 61 and 62, commands the hammer 30, the electromagnets 32 and 39 and the motors 33 and 19.

The unit 26 further includes a permanent memory (ROM) 69 which is specialized to a particular national language and a memory (RAM) 70 which is rendered non-volatile by means of a buffer battery 71. The ROM 69, with a capacity of 4K bytes of 8 bits, specializes the machine as a function of the language of the country for which it is intended, or as selected by the user. The RAM 70 contains pre-recorded phrases, layouts of formats selectable using keys 41, and a series of "standard" lines having pre-set and selectable margins and tabulator stops.

The console 22 includes a key 72 for switching the machine on and off, the selector 73 which selects the line feed from 1,2,3 or 4 elementary line spacings, the selector 74 which selects one of the pitches 1/10", 1/12", 1/15" or proportional PS on the 1/60" basis, and a selector 75 which selects the following machine states: DISK, MOD/P, ENTER, STOR and TPWR which allow, respectively: the carrying out of service functions relating to the floppy disc 38, the modification or printing of the texts contained on the discs 38, the introduction of data into the memory 48 and the recording of same on the disc 38, the recording of constant data into the RAM 70, and operation as a conventional typewriter.

Additionally, the printing selector 76 is provided which selects a W/W state for the delayed printing of words, RIGHT for justified right-hand margins and NORM for providing normal typing, and the character editing selector 77 which provides for the typing to be done in the normal fashion, or underlined, in heavy print or in underlined heavy print.

Finally, the three position keyboard selector 78 LINE FORM is provided for defining the standard line in the non-volatile memory 70, KBI for selection of the standard keyboard 20 and KBII for specializing the keyboard 20 in accordance with a second national standard.

In an identical fashion to conventional typewriters, the characters represented on the alpha-numeric keys 35 (FIG. 1) and their arrangement is in accordance with a national standard which depends upon the country for which the actual machine is intended or on the particular language selected by the user. The keyboard coder 57 (FIG. 2), which is identical for all machines, supplies a crossing code which is indicative only of the line and of the column in which the depressed key 35 is located. The ROM 69, on the basis of this crossing code, supplies all the indications for carrying out selection and printing of the character represented on the depressed key 35 and carried on the national daisy wheel 28 corresponding to the standard for which the typewriter 15 is designed. In the ROM 69 (FIG. 3), the registers bearing addresses from 768 to 2559 furthermore supply guidance messages for the user of the machine, in the language corresponding to that of the standard of the machine, and these appear on the visual display device 21 in order to avoid errors and to facilitate use of the machine.

The national daisy wheel 28 (FIG. 1) carries a font of characters and symbols the number of which, one-hundred, is greater than the number of characters and symbols, actually ninety-two, which can be selected by the alphanumeric keys 35 of the keyboard 20 making use of the upper case-lower case key 79. Certain keys 35 carry a double indication which allows the keyboard 20 to be specialized in accordance with a second national standard. Displacement of the selector 78 from KBI to KBII changes the distribution of the symbols on the keyboard 20 and the significance of certain keys 35 so as to be able to provide up to eight symbols and characters which differ from those present on the standard keyboard. The same standard national display wheel 28 is thus able to print the characters and symbols of the second keyboard 20. In machines 15 of a particular type, placing the selector 78 in position KBII allows the keyboard 20 to be used for languages which are completely different from those of the standard keyboard, this being done after substituting the standard national daisy wheel 28 by a second daisy wheel 28 which carries the font of characters and symbols of the second language.

The electronic unit 26, as a function of the positions KBI or KBII of selector 78, uses the crossing code of coder 57 for addressing a corresponding register in a region 80 (FIG. 3) or a region 81 of the ROM 69 (addresses 512 to 767). The 8 bit output code from the register in region 80 or 81 which has been addressed in this way, represents the machine code of the character to be printed. This code addresses a register in a region 82 of the ROM 69 and, as a result of the addition of a fixed number 256, a corresponding register in a region 83 (addresses 003 to 511). The two output bytes, 84 and 85, from the registers at regions 82 and 83 supply all the information for the printing of the character.

Figure 3:
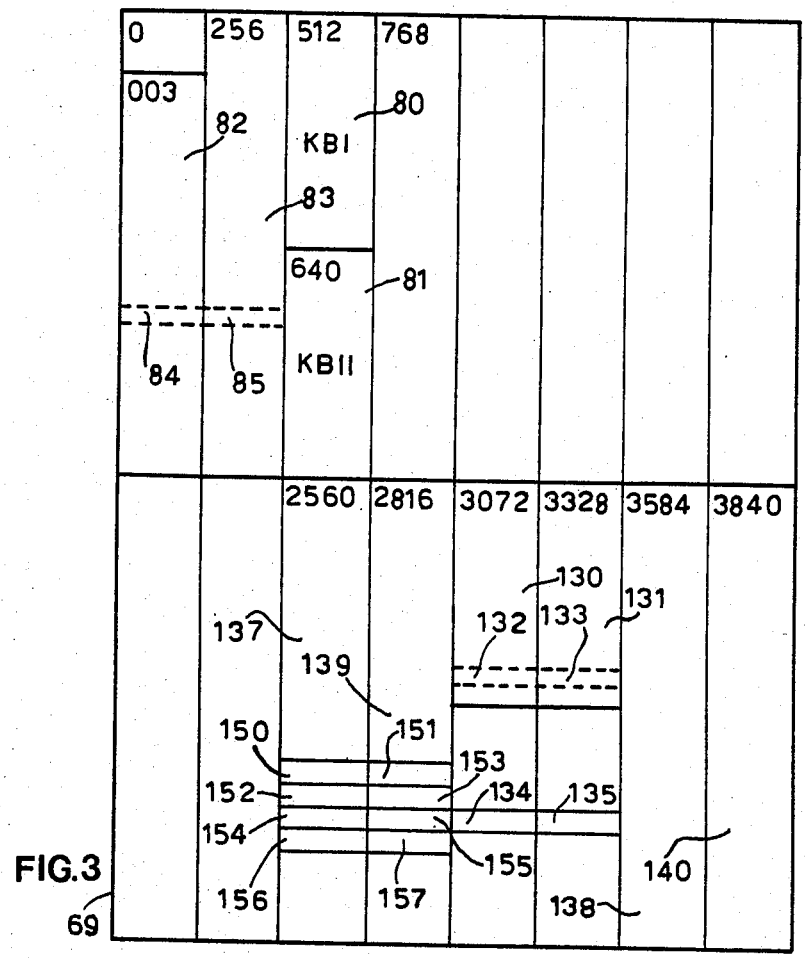
FIG. 3 is a memory map that designates various locations in a memory shown in FIG. 2.
Figure 3A:
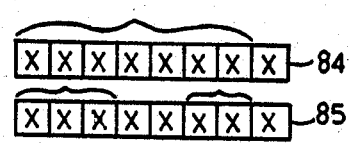
FIGS. 3A, 3B, 3C, 3D and 3E give the content of various locations of the memory map of FIG. 3.

The first seven bits of the byte 84 (FIG. 3A) represent the position of the character on the daisy wheel 28 with respect to a reference petal and are used for rotating the motor 29 until the actual character is selected. In the second byte 85, the first three bits supply the information for the pitch, in elementary steps of 1/60", in the case where selector 74 (FIG. 1) is in the position PS, used for the rotation of motor 29; the fourth bit indicates if the symbol is a comma or a full stop, establishing particular editing conditioning when preparing tables; the fifth and sixth bits supply information for the intensity of strike of the hammer 30; the seventh bit supplies information on the manner of performing the "heavy print" facility and the eighth bit indicates whether the symbol to be printed is of the "dead" type, in other words it does not involve spacing. After the character has been printed, the unit 25 is displaced forwardly by the amount of the pitch, 1/10", 1/12" or 1/5", set up on the selector 74, or rather the number of elementary steps of byte 85 in FIG. 3A and defines the new point of printing on the line.

Figures 4, 5:
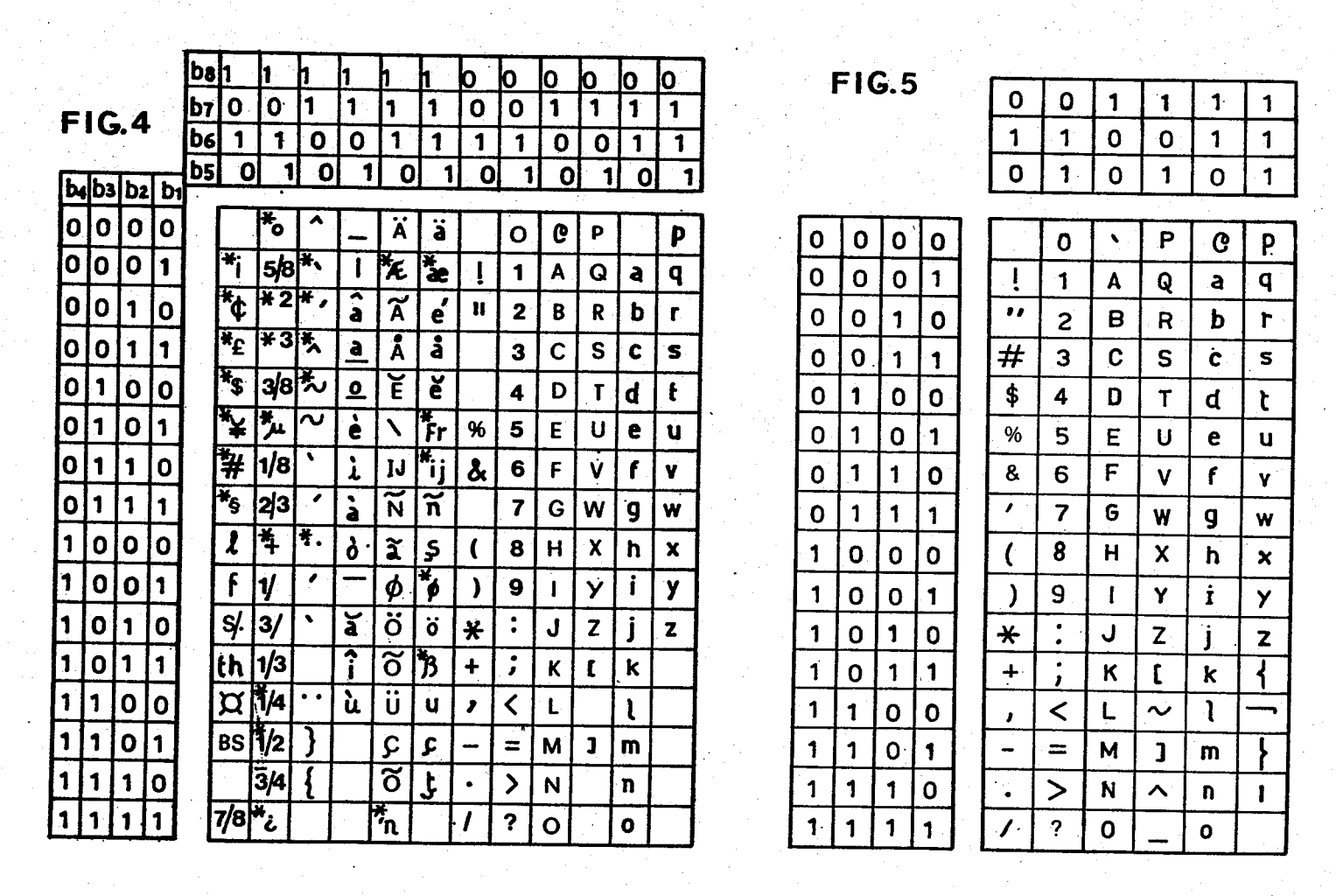

The texts to be typed may originate from the keyboard 20, from disc 38 recorded on the actual machine or on other machines, or they may be received on the line 42. The machines are programmed in such a way that each different character or symbol possesses a specific machine code which is independent of the national standard of the machine and of the position of each key 35 on the keyboard 20. Information about the characters is always associated with this code, and by means of the latter, the character is recorded on discs 38, displayed at the visual display device 21 or transmitted along the line 42. FIG. 4 shows, by way of example, a table of codes for characters and symbols which may be generated by groups of machines which adopt national standards corresponding to languages which employ the Latin alphabet.

The characters and the symbols given in the table of FIG. 4 are adequate for typing the written symbols of the commonly used languages and of the eight bit transmission code ASCII (FIG. 5). Nevertheless, using the eight bits available in the machine code, numerous other characters and symbols can be added. By way of example, the machines may be specialized to write the written symbols and characters given in the draft recommendations, ISO/TC 97/SC2/WG4 No. 198 for the teletex system, dated Feb. 29, 1980, which have many characters in common (indicated by an asterisk) with those given in FIG. 4. Machines of one specific national standard are able to generate one or two sub-sets of ninety-two characters of the table in FIG. 4 or of the teletex system.

In the case where the machine code of the character to be typed has been generated by another machine and received either via a disc 38 or on the line 42, the programmes of the base ROM 69 are adapted to be able to memorize the characters in the RAM 48 and optionally to display them on the visual display device 21. If the machine code is one of those which can be generated by the keyboard KBI or KBII, the bytes 84 and 85 (FIG. 3) of the regions 82 and 83 of the ROM 69 will correspond to this code and printing of the character takes place as has already been described. If, on the other hand, this code is not one which is provided for in the ROM 69, the character received is not able to be transcribed. The machine recognizes this situation and provides for the printing of a vertical bar, which is present on each national daisy wheel 28, and this is repeated three times with only a short distance between each bar.

In accordance with the invention, the typewriter 15 employs a typing device which is able to print characters and symbols of all the national standards which are derived from one single alphabetical stem and which differ from the standard of the machine. The device includes an international "daisy wheel" 28 which is to be fitted on the machine as a replacement for the national "daisy wheel" 28 specific to the typewriter 15, and circuit means 46, 47, 69 which allow the machine to print the desired character using the international "daisy wheel" 28, this either being done directly or using a combination of other signs and several strikes. These circuit means 46, 47, 69 are put into operation by operating a CODE key 68 (FIG. 1) and the key "K" of the alphanumeric keys 35.

Figure 6:
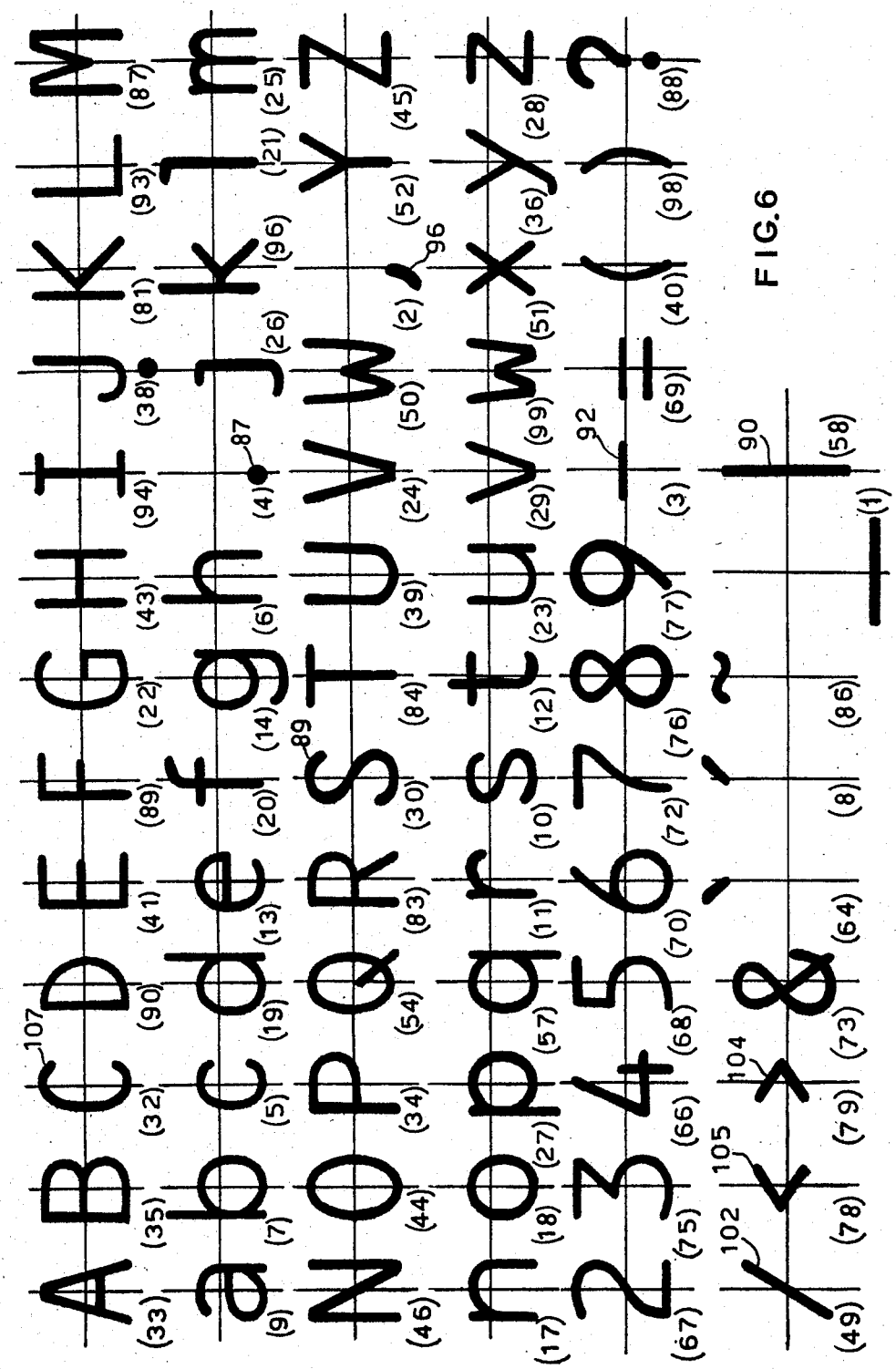
FIGS. 6 and 7 give details of the characters and symbols used with the machine in FIG. 1.
Figure 7:
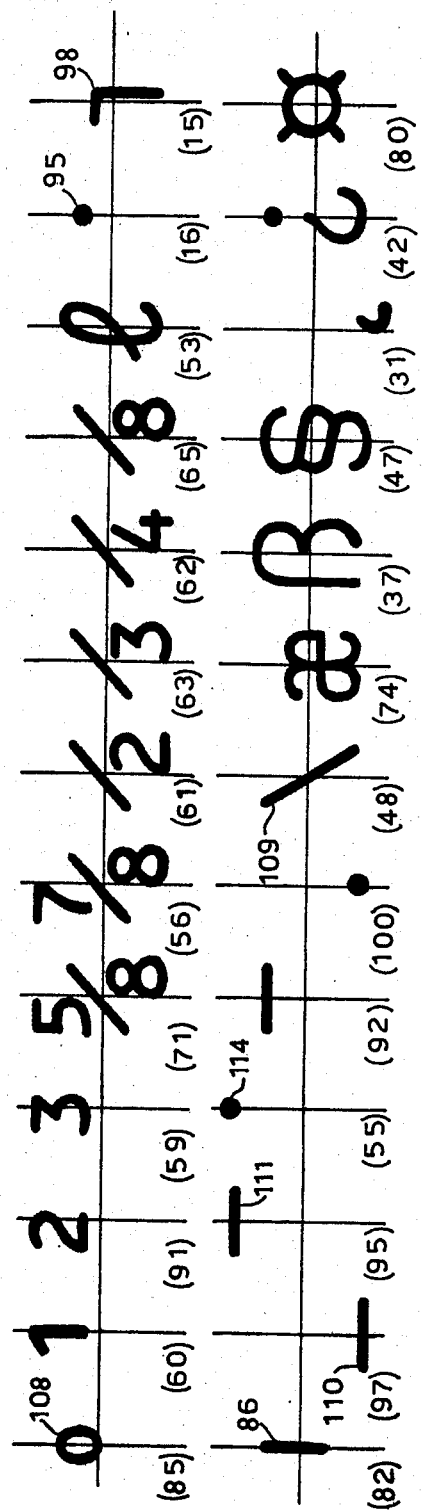

The international "daisy wheel" 28 is mechanically identical to the national one, it being of the type having one hundred character-bearing petals as described in the U.S. Pat. No. 4,236,838. In the example below, the daisy wheel 28 has been designed for printing the characters and symbols derived from the Latin alphabet and shown in the table in FIG. 4. Seventy-four of the characters and symbols on the international "daisy wheel" 28, indicated in FIG. 6, are recognizable as being sub-sets of the ninety-four characters and symbols provided by the ASCII standard in FIG. 5 and possess machine codes which are substantially identical to those of this same transmission standard. The remaining twenty-six characters and signs in FIG. 7 are, on the other hand, of a special type. Both the characters in FIG. 6 and those in FIG. 7 have been shown in relation to their theoretical point of printing at the point of crossing of a vertical axis lying on the mean plane of the hammer 30 and of the axis of the line of type. Additionally, the angular position of each character (from 1 to 100) on the daisy wheel 28 has been shown in brackets, and where the underlining sign has position 1.

The characters have a form of the "thin stick" "sans serif" type similar to that provided for by the European Computer Manufacturers Association, Rue de Rhone, 114 CH-1204 Geneve-Switzerland, on its Standard ECMA-11 for the alphanumeric character set OCR-B for optical recognition, published in March 1976. Some of the symbols in FIG. 6, e.g. the vowel o (O) in the upper case and the letter l in the lower case are used additionally for the zero (0) and for the number one (1). Consequently, one single machine code and one single character on the daisy wheel 28 will correspond to two differing keys 35 on the keyboard 20.

Figure 8:
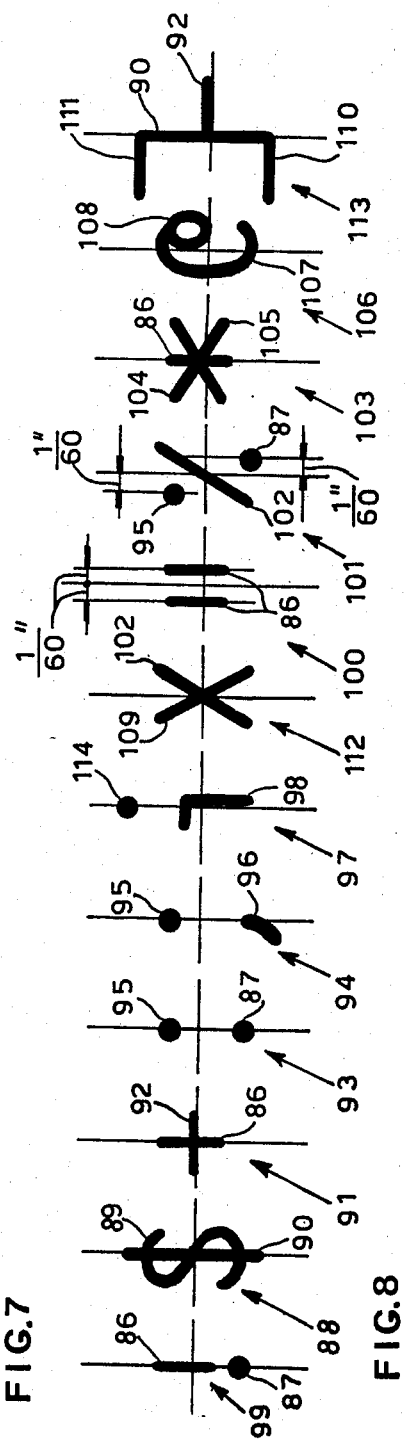
FIG. 8 gives details of the characters and symbols which are printable in accordance with the invention.

The characters to be typed which differ from those present on the international "daisy wheel" 28 are printed using successive strikes of one or several characters and/or symbols, with or without displacement of the point of printing, so as to combine in a suitable fashion the characters and symbols given in FIGS. 6 and 7. By way of example, printing of the ASCII characters which are lacking on the international "daisy wheel" 28 is obtained without any displacement of the print unit 25 occurring as follows (see also FIG. 8). The exclamation mark (!) 99 (FIG. 8), is obtained by a double print operation using the short vertical stroke (') 86 (FIG. 7) and of the full stop (.) 87 (FIG. 6); the dollar symbol ($) 88 (FIG. 8), is obtained using the capital S 89 (FIG. 6) and the long vertical stroke (|) 90; the plus sign (+) 91 (FIG. 8) is obtained using the horizontal stroke (−) 92 (FIG. 6) and the short vertical stroke (|) 86 (FIG. 7); the colon (:) 93 (FIG. 8 and the semicolon (;) 94 are obtained using the mid-height dot (·) 95 (FIG. 7) and, respectively, the full stop (.) 87 and the comma (,) 96 in FIG. 6; the vowel i (i) 97 (FIG. 8) is obtained using the upper dot (·) 114 (FIG. 7) and the vowel i without its dot (l) 98 in FIG. 7; the capital (X) 112 (FIG. 8) is obtained using the oblique stroke sloping to the right ( ) 102 (FIG. 6) and the oblique stroke sloping to the left ( ) 109 (FIG. 7).

The other ASCII characters which are lacking are printed using composition of characters and contemporaneous displacement of the point of printing: the inverted commas sign (") 100 (FIG. 8) is obtained using repeated strikes of the short vertical line (') 86 (FIG. 7) at points of printing which are displaced by 1/60" forwards and backwards with respect to the theoretical point of printing. In an analagous fashion, the percent sign (%) 101 (FIG. 8) is obtained using three print operations: using the mid-height dot (•) 95 (FIG. 7) displaced rearwards by 1/60", the oblique stroke ( ) 102 (FIG. 6). at the theoretical point of printing and, finally the full stop (.) 87 displaced by 1/60" forwards. The asterisk sign (*) 103 (FIG. 8) is obtained using three strikes: the symbol for greater than (>) 104 (FIG. 6) displaced rearwards by 1/60", the short vertical stroke (') 86 (FIG. 7) at the theoretical point of printing, and the symbol for less than (<) 105 (FIG. 6) displaced forwards by 1/60″. The commercial a (@) of 106 (FIG. 8) is obtained using two strikes employing the capital c (C) 107 (FIG. 6) at the theoretical point of printing and the degrees symbol (°) 108 (FIG. 7) displaced by 1/60″ forwards. The bracket clamp (}) 113 (FIG. 8) is obtained using four print operations employing the short underlining stroke (_) 110 (FIG. 7) and the overlining symbol (‾) 111 displaced backwards by 2/60″, the vertical stroke (|) 90 (FIG. 6) at the theoretical point of printing and the horizontal stroke (—) 92 displaced forwards by 1/60″. As will be seen from the examples given in FIG. 8, the composition of the characters gives rise to a typescript having characters the outline of which is substantially continuous, this being completely acceptable at a formal level. Using this technique, which is easily applicable to other cases, it is possible to print all the characters given in the table in FIG. 4 and in the ISO recommendations referred to above.

Figure 2:
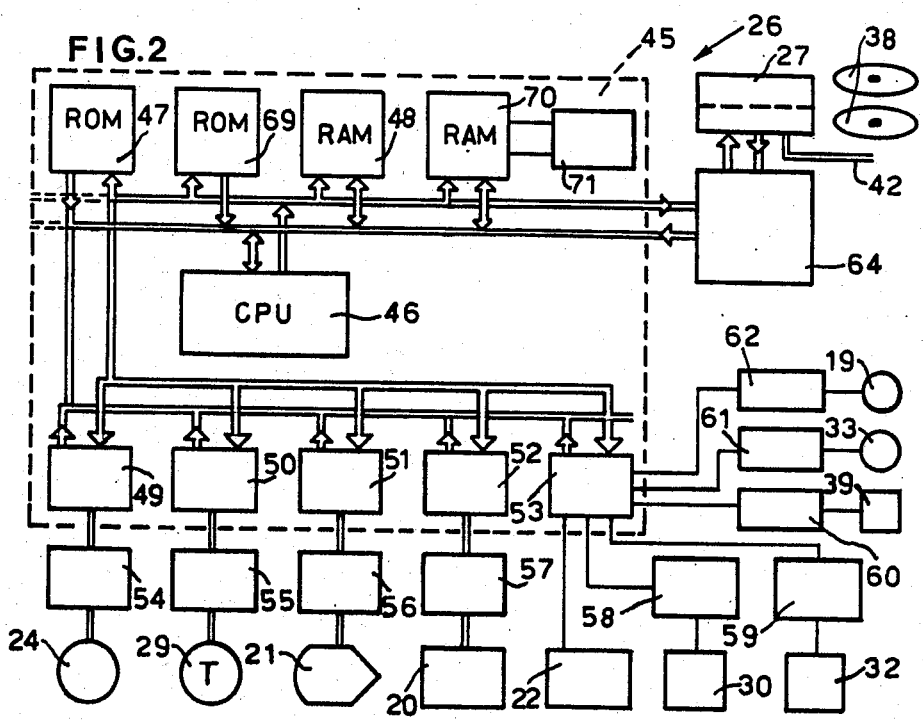
FIG. 2 is a block diagram of the control circuits of the machine in FIG. 1.
Figure 3B:
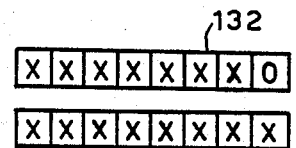

In accordance with the invention, the operational information for typing the characters using the international daisy wheel 28 are inserted in the ROM 69 specialization (FIG. 2). When the machine is operating in the normal mode, or when the "CODE" key 68 and "K" key 35 have been selected, the machine code for the character to be printed represents the register address of a region 130 in the ROM 69 (FIG. 3 addresses 3072 to 3327) and from which, using the addition of 256, a corresponding register in a region 131 is identified. The two registers of the regions 130 and 131 generate two bytes of eight bits. If the machine code received relates to a character which is present on the international "daisy wheel" 28, the state of the eighth bit of the first byte 132 (FIG. 3B) is a "1", indicative of the fact that the character may be printed by means of one single strike; the other bits of the byte 132 and of the second byte 133 then have, with parity of position, the same significance as the bits of the two bytes 84 and 85 (FIG. 3A) generated by the regions 82 and 83 of the ROM 69 (FIG. 3) and supply all the indications required for selecting the character on the daisy wheel 28 and for the editing of the actual character.

Figure 3C:
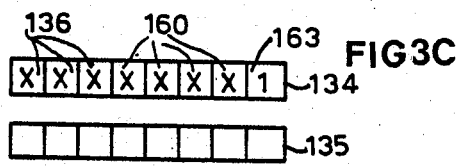

If the machine code received relates to a character which is not completely present on the international "daisy wheel" 28, the addressed registers of the regions 130 and 131 supply two bytes 134 and 135 in which the first byte 134 (FIG. 3C) has its eighth bit in the "1" state indicative of the composition of the character being obtained using several strikes. The significance of the bits of the bytes 134 and 135 is different from that of the bytes 84 and 85. The first three bits 136 of byte 134 and of byte 135 define the address of a register in a region 137, 138 (addresses 2560 to 2815; 3584 to 3839), this address being associated, by means of the addition of 256 bits, with a corresponding register in a region 139, 140. These addresses are the first ones of a sequence of two, three, or four other addresses, in succession, which supply pairs of bytes 150, 151; 152,153; 154,155; 156, 157 analogous to the bytes 84, 85 with all the printing information for composing the character received. The state of the bits 160 (FIG. 3C), from the fourth one to the seventh one, of byte 134 define the sense of displacement of the point of printing, with respect to the theoretical point of printing, of the sign or the character to be printed, respectively for the first, second, third and the fourth printing operation. When the state of this bit is a "1" this indicates a forwards displacement whilst a "0" state indicates a rearwards displacement of the print unit 25.

Figure 3D:
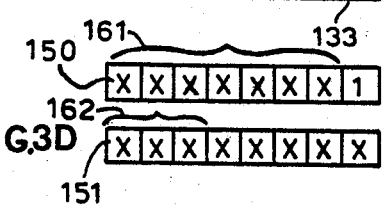
Figure 3E:
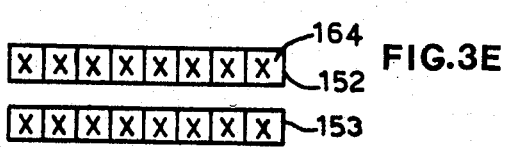

The two bytes 150, 151 generated at the first address of the regions 137, 139; 138, 140 supply the printing information for the first symbol. In an analogous fashion to the bytes supplied by the regions 80 and 81, the first seven bits 161 of the first byte 150 (FIG. 3D) supply the positioning code on the daisy wheel 28 for the first symbol and the first three bits 162 of the second byte 151 supply the spacing code which in this case represent the displacement of the point of printing for this particular symbol, and with respect to the theoretical point of printing, in elementary steps of 1/60″, prior to the character being struck and in the drive sense indicated by the fourth bit of byte 134. The eighth bit 163 of the byte 134, when it is at "1", supplies the information that a second strike is necessary. When the first strike has been carried out, the information for the second symbol, bytes 152 and 153, are generated by the register following the one which generated the bytes 150 and 151. Printing of the second symbol takes place in the same fashion both as regards selection and spacing, as was done for the first symbol. In this second case, the state of the eighth bit 164 of the first byte 152 (FIG. 3E) when it is at "0" or, respectively, at "1" will indicate if the character received is now complete or whether it is necessary to perform a third strike, and the state of the eighth bit of byte 154 will indicate the necessity of performing a fourth strike. The information for the third and the fourth strikes will be supplied by the byte 154, 155 and 156, 157. The fourth strikes will, in every case, complete the sequence with the "0" state of the eighth bit of byte 156.

The dimensions of the characters of the international daisy wheel 28 are such as to allow an aesthetically acceptable pitch, this either being 1/10″ or 1/12″. When the machine is operating in the CODE K mode, the positions of the selector 74 for proportional spacing, PS, and 1/15″ will be interpreted, respectively, as positions for pitches of 1/10″ and 1/12″.

Depression of the keys 35 on the keyboard 20 in the CODE operating mode is recognized in accordance with the position of the keyboard selector 78, when operating in the KBI or KBII modes. In this case, however, the machine code of the character addresses a register in the regions 130 and 131 (FIG. 3) for printing the character in accordance with the rules applying to the international "daisy wheel" 28.

Operating under "international" conditions is indicated on the display device 21 of the machine and this does not alter the operation of the machine which maintains all the facilities provided for the keyboard mode KBI and KBII. In particular, automatic erasing of characters, the typing of standard phrases and the various editing functions are maintained. The only difference will consist of several cycles being carried out for composing the characters of the print and for cancelling out of typed characters.

The setting of a character code, in accordance with the rules of the international daisy wheel 28 is effected in an alternative version of a machine by providing a position KB III of the keyboard selector 78. The introduction of a character code and following editing and print occurs as in previously described CODE K mode. Each code generated upon depression of a key 35 may be, in this case, different from that obtained when the same key 35 is depressed in KB I or KB II position of selector 78. The indication of the new meaning will be suitably represented in the cap of the keys 35. The characters entered according to KB III position of the selector 78 will be displayed on the visual display device 21 and correctly printed, by composition, when the national daisy wheel 28 is replaced with the international one.

Another variant of a typing device according to the invention is provided wherein the typewriter 15 is of a national type but it is capable of setting and printing more than the 100 characters of the daisy wheel 28 but less than 300 characters of a Teletext characters font. A typical example is given by the characters used by the European countries including Italy and France, Germany, Great Britain, the Netherlands, Denmark, Spain, Portugal. In this case, the daisy wheel 28 comprises all basic characters of these languages and multi functions signs which are used to define the diacritic signs of the characters. The composition of characters is then limited to the automatic combination of the diacritic signs on the characters, where necessary. The keyboard 20 comprises the usual number of keys 35. However a multi position country selection lever not shown in the drawing can be provided at a side of the keyboard 20 which modifies the meaning of some keys 35. The various meanings are indicated on the key cap with different colours which correspond to the different positions of the country selection lever indicated by the same colour used for the indication on the caps. In this manner, by a suitable position of the country selection lever, all characters with diacritic sign may be automatically set. The character code generated on the ROM 69 addressed by the depressed key 35 gives the information if this character would be printed directly or by composition. In this last case the print will occur automatically with more prints according to the rules of the international daisy wheel 28.

In view of the fact that the composition is limited to the diacritic signs, the daisy wheel 28 may be manufactured according to a large variety of styli, pitch and dimensions as in the normal national daisy wheels 28.

We claim:

1. A typing arrangement comprising means for receiving codes corresponding to symbols to be typed which belong to several coordinated systems of written language; a platen defining a printing line including a plurality of printing points wherein said printing points are spaced according to a given pitch; and an international symbol-bearing wheel which carries a plurality of symbols, wherein said plurality of symbols is less than the number of symbols which belong to said coordinated systems of written language, and wherein said codes comprise a first group of codes corresponding to symbols included in said plurality of symbols carried by said international symbol-bearing wheel and a second group of codes corresponding to symbols missing from said international symbol-bearing wheel; selecting and printing means for rotating said international symbol-bearing wheel to select one of said plurality of symbols in front of one of said printing points and printing one of said plurality of symbols; spacing means for displacing said international symbol-bearing wheel along the printing line in front of said one printing point; and control means which respond to a received code of the first group of codes for selecting and printing directly a symbol of said plurality of symbols carried by said international symbol-bearing wheel, or alternatively, said control means responds to a received code of the second group of codes to automatically select and print in succession a group of component symbols of said plurality of symbols in order to reproduce, by making use of combinations of said symbols carried by said international symbol-bearing wheel, a missing symbol, which corresponds to said received code of the second group of codes; wherein each component symbol of said group of component symbols is printed at a position of printing either aligned with said one printing point or spaced a fraction of said pitch with respect to said one printing point; and wherein said control means comprises a memory having a first and a second portion, wherein the first portion of said memory comprises a plurality of characters each associated with the location on said symbol-bearing wheel for each of said plurality of symbols carried by said symbol-bearing wheel, and corresponding to said first group of received codes and wherein the second portion of said memory stores a plurality of characters associated with said component symbols of the symbols missing from said international symbol-bearing wheel, to define the position of each of said component symbols on said international symbol-bearing wheel and the position of printing of each of said several component symbols with respect to said printing point, first means for fetching one of the characters of the first portion of the memory with the received code of the first group of codes for causing said selecting and printing means to print said one symbol of said plurality of symbols at said one printing point and second means for fetching a group of the characters of the second portion of the memory with the received code of the second group of codes, and means responsive to the group of fetched characters of said memory for actuating said selecting and printing means and said spacing means to print the group of component symbols at the positions of printing defined by the fetched characters of said group of character in order to reproduce the missing symbol corresponding to the received code at said one printing point.

2. A typing arrangement in accordance with claim 1, wherein a national symbol-bearing wheel of a national set of symbols can be fitted in place of the international symbol-bearing wheel, wherein said memory comprises a further portion having characters defining the position of each symbol of said national symbol-bearing wheel, and further comprising selector means which actuate a national mode of operation of the typing arrangement for accessing the characters of said further portion of memory to print the symbols of the national symbol-bearing wheel in response to the received codes corresponding to said national symbols.

3. A typing arrangement in accordance with claim 2, wherein said control means responds to the national mode of operation and responds to codes for symbols which are missing from the national symbol-bearing wheel, in order to print out a predetermined error symbol on the national symbol-bearing wheel, indicative of the absence of the symbol corresponding to the received code.

4. A typing arrangement for receiving codes corresponding to symbols to be typed which belong to systems of written language, comprising:
a platen defining a printing line including a plurality of typing areas, wherein said typing areas are spaced according to a given typing pitch;
a selector body carrying an international symbol-bearing element, which carries a number of symbols less than the number of said symbols to be typed for selecting and printing one of said symbols to be typed on one of said typing areas;

a memory for the printing of said symbols to be typed and having a series of registers which can be addressed selectively in response to the code for a symbol received and a plurality of sets of registers;

wherein each register of said series of registers contains either an information for selecting and printing a symbol of said international symbol-bearing element on the one of said typing areas or an information for accessing one set of registers of said plurality of sets of registers, and wherein each register of said sets of registers contains a first information for selecting and printing an associated component symbol of said international symbol-bearing element on the one of said typing area and a second information indicative that another register of said one set of registers should be accessed or should be not accessed; and control means which respond to the content of an addressed register of said series of registers either for the printing of the symbol on said international symbol-bearing element on the one of said typing areas, or alternatively, for accessing an associated set of registers of said plurality of sets of registers; and wherein said control means respond to the content of all the registers of said associated set of registers for printing in sequence component symbols of the international symbol-bearing element, on the one of said typing areas in order to reproduce on the one of said typing areas each symbol missing from the international symbol-bearing element by making use of component symbols of said international symbol-bearing element.

5. A typing arrangement for receiving codes corresponding to symbols to be typed at a typing areas which belong to several written languages, comprising:

a symbol-bearing element which carries a number of symbols less than the number of symbols present in said written languages;

selecting means actuatable for selecting and printing each symbol on said symbol-bearing element, wherein the symbols missing from the symbol-bearing element are reproduced as repeated sequential selecting and printing of a plurality of component symbols on the said symbol-bearing element;

a series of registers and a plurality of sets of registers for storing multibit words, wherein each register of said series of registers can be addressed selectively in response to each one of the received codes, wherein each multibit word of each register of said series of registers includes a bit which indicates whether a symbol to be typed associated with a received code is present on the symbol-bearing element or is missing from said symbol-bearing element;

wherein each multibit word of each register of said series of registers which includes said bit for a symbol present on said symbol-bearing element contains coded information for actuating said selecting means to directly print the symbol to be typed on said typing area;

wherein each multibit word of said series of registers including said bit for the missing symbol contains the address of one register of a set of registers of said plurality of sets of registers, and in which each multibit word of said registers of said plurality of sets of registers contains information for the selection and printing of a corresponding component symbol on said symbol-bearing element;

means for sequentially accessing all the registers of said set of registers including said one register; and means responsive to the information of an addressed register of said set of registers, for actuating the selecting means to print on said typing area all the component symbols of the symbol, missing from said symbol-bearing element.

6. A typing device according to claim 5, wherein said typing area include a reference printing point and is spaced with respect to adjacent typing areas according to a given pitch including a group of elementary steps, wherein the symbols which compose the missing symbols are printed either on said reference printing point or on an associated offset typing point spaced a number of said elementary steps and wherein said information consists of a code giving the position of the component symbols on the symbol-bearing element and a code indicating the number of elementary steps defining the displacement of the offset printing point of each component symbol of the missing symbol with respect to said reference printing point.

7. A typing arrangement for receiving codes corresponding to symbols to be typed which belong to several written languages, comprising:

a platen defining a printing line including a plurality of theoretical points of printing spaced according to a given pitch;

a selector body carrying a symbol-bearing element which carries a plurality of symbols less than the symbols of said written languages;

spacing means for spacing said symbol-bearing element in front of said theoretical points of printing for the printing of said symbols according to said pitch;

wherein a first group of said symbols to be typed is carried by said symbol-bearing element and a second group of symbols to be typed is missing from said symbol-bearing element;

control means for controlling whether a received code corresponds to said first group of symbols or to said second group of symbols;

selecting and printing means for printing the symbols corresponding to received codes on one theoretical point for printing of said theoretical points of printing;

a plurality of sets of registers wherein each set of registers of said sets of registers is selectively accessible in response to an associated received code corresponding to said second group of symbols; and wherein each register of said set of registers contains a printing information for causing the selecting and printing means to print an associated component symbol of said symbol-bearing element either on said one theoretical point of printing or on offset typing points spaced given fractions of said pitch at the left or the right of said one theoretical point for printing, and an information either for accessing another register or said set of registers or for stopping access to said set of registers for enabling said selecting and printing means to automatically select and print in succession each associated component symbol either on said one theoretical point of printing or on one of said offset typing points;

wherein said control means responds to the received code corresponding to the first group of symbols in order to cause said selecting and printing means to select and print directly a selected symbol on said symbol-bearing element on said one theoretical point of printing; and wherein said control means responds to the received code corresponding to the second group of symbols to access one register of an associated set of said registers and causing said selecting and printing means to print several symbols on said symbol-bearing element in order to reproduce, by making use of combinations of component symbols carried by said symbol-bearing element, the symbol of said written languages which is missing from the symbol-bearing element;

wherein the symbols which compose the missing symbols are printed at positions of printing which are associated, in a predetermined fashion, with the theoretical point of printing of each missing symbol; and wherein said printing information consists of a code giving the position of the component symbols on the symbol-bearing element and a code indicating the direction and the number of fractions of said pitch for the displacement of the offset typing point of said component symbol with respect to the theoretical point of printing.

8. A typing arrangement for typing a set of symbols comprising:

a platen including a plurality of typing areas spaced according to a given pitch;

a selector body carrying a symbol-bearing element, which carries a subset of symbols less than said set of symbols;

a plurality of actuatable keys, wherein each key of said actuatable keys is associated with a symbol to be typed included in said set of symbols;

code generating means responsive to actuation of each of said plurality of actuatably keys for generating a character code associated with said symbol to be typed;

control means for controlling whether a character code generated by said code generating means corresponds to symbols included in said subset of symbols or excluded from said subset of symbols;

spacing means for spacing said symbol-bearing element in front of a reference point of each of said typing areas and for spacing said symbol-bearing element through fractions of said given pitch into offset printing points within each of said typing areas;

selecting and printing means for printing the symbols corresponding to the character code generated by said code generating means on one typing area of said typing areas;

wherein said control means respond to a character code associated to a selected symbol included in said subset of symbols for causing said selecting and printing means to select and print directly said selected symbol on said symbol-bearing element on the reference printing point of said one typing area;

wherein said control means respond to a character code associated with a selected symbol excluded from said subset of symbols for causing said spacing means to space the symbol-bearing element into a group of the offset printing points and for causing said selecting and printing means to selectively print several symbols on said symbol-bearing element either on said printing point or on said group of the offset printing points in order to reproduce, by making use of combinations of component symbols carried by said symbol-bearing element, the selected symbol of said written languages excluded from said subset of symbols in said one typing area.

9. In a typing arrangement for typing a set of symbols which belong to several written languages, comprising a keyboard having actuatable keys associated with national symbols included in said set of symbols and code generating means responsive to actuation of said keys for generating character codes associated with said national symbols; the improvement comprising:

a selector body mounting either an international symbol-bearing element or a national symbol-bearing element, wherein the international symbol-bearing element carries a number of symbols less than said set of symbols and the national symbol-bearing element carries said national symbols wherein said character codes include a first group of codes corresponding to symbols carried by said international symbol-bearing element and a second group of codes corresponding to symbols missing from said international symbol-bearing element;

switching means actuatable for defining either a national mode of operation or an international mode of operation of the typing arrangement; and control means operatively connected with said code generating means for enabling the printing of the national symbols associated with the actuated keys either by the international symbol-bearing element or by the national symbol-bearing element;

wherein said control means respond to said national mode of operation and to character codes generated by said code generating means for selecting and printing the associated national symbols on the national symbol-bearing element mounted on said selector body as single printing of said national symbols; and wherein said control means respond to said international mode of operation and to said character codes to print said national symbols either as single printing of said national symbols on the international symbol-bearing element mounted on said selector body, if said character codes are included in said second group of codes.

10. In a typing arrangement comprising a platen including a plurality of printing points spaced according to a given pitch, a symbol-bearing element which carries a number of symbols less than the number of symbols to be typed, selecting means actuatable for selecting and printing each symbol on the said element at a given point of said printing points, and control means and actuating means actuating the selecting means to reproduce the missing symbols as repeated printing of component symbols on said element, the combination comprising:

spacing and printing means for printing each component symbol of a missing symbol on an associated point adjacent to but displaced an amount from said given point less than said given pitch;

memory means for storing coded information for each component symbol of the missing symbol including selection codes for the actuation of the selecting means and spacing codes indicative of said amount; and means for accessing the coded information of each component symbol of said memory means; wherein the control means associated the selection code of each component symbol with its spacing code, and wherein the actuating means respond to the stored coded information for each component symbol to cause the selecting means and the spacing and printing means to print all the component symbols of the missing symbols at their associated points.

11. A typing arrangement in accordance with claim 10, characterised by a series of registers of the memory means which can be addressed selectively in response to the received codes and by means which respond to the content of the addressed registers either for the printing of the symbol on said element or, alternatively, for sequentially reading out the coded information of the memory means to initiate the printing sequence for the component symbols of the missing symbol.

12. A typing arrangement in accordance with claim 10, characterised by missing symbol registers of the memory means which are associated in one-to-one correspondence with the missing symbols, wherein each of said missing symbol registers contains the address of at least one register of a set, and wherein each register of the set of registers contains at least a part of the coded information for the selecting means and the printing and spacing means for the printing of the corresponding component symbol on said symbol-bearing element.

13. A typing arrangement in accordance with claim 10, wherein the symbol-bearing element comprises a rotatable type-carrier wheel mounted on a carriage movable with respect to the platen and the spacing and printing means comprise a motor for moving the carriage and a hammer mounted on the carriage for printing a selected character of the said type-carrier wheel, wherein the code information for the component symbols comprises a code giving the position of the carriage with respect to the given point and a code indicating the sense of movement and the number of elementary steps for the displacement of the carriage with respect to said given point.

* * * * *